United States Patent [19]

Cordray

[11] 4,295,175
[45] Oct. 13, 1981

[54] PILOT WIRE RELAY PROTECTION SYSTEM FOR ELECTRICAL DISTRIBUTION NETWORKS

[75] Inventor: Daniel E. Cordray, Media, Pa.

[73] Assignee: General Electric Company, Philadelphia, Pa.

[21] Appl. No.: 142,512

[22] Filed: Apr. 21, 1980

[51] Int. Cl.³ .............................................. H02H 7/26
[52] U.S. Cl. ......................................... 361/69; 361/64
[58] Field of Search ............................ 361/64, 68, 69

[56] References Cited

U.S. PATENT DOCUMENTS 1,946,859  2/1934  Kapp et al. ........................... 361/69
2,183,537  12/1939  Bostwick ............................. 361/69

OTHER PUBLICATIONS

Gen. Elec. Instruction Book GEH-1811C, "A-C Pilot Wire Relay".

*Primary Examiner*—J. D. Miller
*Assistant Examiner*—Reinhard J. Eisenzopf
*Attorney, Agent, or Firm*—William Freedman; John P. McMahon

[57] ABSTRACT

A pilot wire relay protection system for detecting and responding to phase-to-phase, three-phase, phase-to-phase to ground, and ground current faults including relatively low level ground current faults occurring within an electrical power network is disclosed. The pilot wire relay protection system includes current transformers coupled to transmission lines of the electrical power network for developing coupled currents representative of the transmission-line currents. The current transformers are positioned at the ends of a section of the electrical power network for which protection is desired. The coupled currents from the current transformers are inputted to pilot relays having an analog device for producing a composite signal indicative of the condition of the protected section of the network. The pilot wire relay also includes an electronic device to detect if preset fault limits have been exceeded. Upon detecting a condition indicative of a fault within the protected section, the pilot relay transmits an electrical signal to a power circuit breaker which in turn disconnects the protected section of the electrical power network from the remainder of the network.

13 Claims, 3 Drawing Figures

PILOT WIRE RELAY PROTECTION SYSTEM FOR ELECTRICAL DISTRIBUTION NETWORKS

BACKGROUND OF THE INVENTION

This invention relates to a protection system for an electrical power network, and more particularly, to a pilot wire relay protection system for detecting and responding to phase-to-phase, three-phase, phase to phase and to ground, and ground-current faults including relatively low level ground current faults occurring within the electrical power network.

Various pilot wire relays derive their information of the condition of a protected line of a high voltage transmission network from current transformers each having their primary winding arranged across a portion of each high voltage transmission line which is typically conducting one phase of the power transmission network. Such a pilot wire relay is described in a General Electric Instruction Book GEH-1811C, published by General Electric Company, Power Systems Management Business Department, Philadelphia, Pennsylvnia, 19142. Current transformers arranged across the high voltage transmission lines may be subjected to heavy currents that occur during faults within the systems at which time the current transformers may become saturated and their output may not correctly represent the condition of the transmission lines. Furthermore, faults within a high voltage distribution system may cause excessively high currents to flow within the transmission lines. The relatively large current may cause, by residual magnetism, the cores of the current transformers to be placed in a magnetized state after the current is removed from the system. The magnetized condition of the current transformers may in turn cause the transformers to provide an erroneous output signal representative of a faulted condition even though the magnitude of the current flowing within the transmission line is representative of a non-faulted condition. In certain power systems, typically industrial systems, it is common practice to limit the maximum ground fault current by the use of a power resistor. The power resistor is typically connected to the neutral of the high voltage power network and limits the maximum current occurring during a ground fault in an industrial system, to a value typically in the order of 400 amperes. However, current transformers coupled to a transmission line with this ground fault limiting resistor may still provide erroneous signals and thus limit the desired protection for the power network.

The present invention provides an arrangement of current transformers which is substantially less susceptible to the erroneous effects produced by relatively high current flowing within an electrical distribution network.

Accordingly, an object of my invention is to utilize this novel arrangement of current transformers, having reduced error susceptibility to high current faults, as the input source to a pilot wire relay protection system to correspondingly provide more accurate protection for electrical distribution network.

Another object of my invention system is to utilize this novel arrangement of current transformers as the means for allowing a reduction to the minimum fault current detectable as a ground fault condition and to permit the design of electrical distribution networks wherein the maximum ground fault current has been limited to values lower than heretofore possible while still providing rapid detection of ground faults.

Still further, it is another object of my present invention to provide a pilot wire relay having analog and electronic means to supply an improvement to the accuracy at which the plot wire relay protection system determines the condition of the protected portion of the electrical network.

SUMMARY OF THE INVENTION

In carrying out the invention in one form, I provide a pilot wire relay protection system for protecting a section of a high voltage power network located between first and second circuit breakers and comprising at least a first and a second transmission line each constituting a phase of the network. The pilot wire protection system detects and responds to phase to phase faults, phase to ground faults and phase to phase to ground faults that may occur within the protected section by detecting and responding to an excessive differential current existing between a first and a second end of the protected section. The pilot wire relay protection system comprises a plurality of current sensors, at least a first and a second pilot relay, a pilot wire means and means adapted to couple to circuit breakers. The plurality of current sensors are each coupled to a transmission line and arranged into a first group located at the first end of the protected section for respectively developing coupled currents representative of transmission-line currents flowing at the first end of the protected section and a second group located at the second end of the protected section for respectively developing coupled current representative of transmission-line currents flowing at the second end of the protected section. The first and second groups of current sensors have at least a first, a second, and a third current sensor respectively coupled to the first, the second, and the combination of the first and second transmission lines. The third current sensor develops a coupled current representative of currents flowing within the first and the second transmission lines at the third current sensors, so that upon the occurrence of a phase-phase fault causing a relatively high current to flow within the protected section, the coupled current from the third current sensor will be representative of the difference between the transmission-line currents at said third current sensor flowing toward and away from the location of the fault, and such that the coupled current from the third current sensor will be substantially unchanged by the relatively high current flowing within either of the transmission lines of said protected section during the phase to phase fault, whereby the third current sensors remain unaffected by the phase to phase fault and thus able to provide a coupled current representative of the currents flowing within the transmission lines upon a subsequent occurrence of a phase to ground fault within the protected section. Each of the first, second, and third current sensors have a first and a second terminal. The first and second current sensors of each group have their second terminal connected together. The first pilot relay is coupled to the first and second terminals of each of the current sensors of the first group. The second pilot relay is coupled to the first and second terminal of each of the current sensors of the second group. Each of the pilot relay being responsive to coupled current from its associated current sensors have means for generating a first output signal representative of the composite of the current coupled from its associated first, second and third sensors. The pilot wire means comprises first and second conductors for coupling said first output signals together. Each of the first and second pilot relays have further means for generating a second output signal if the current flowing between the first and second conductors and the voltage difference between the first and second conductor exceed predetermined limits. The means adapted to the circuit breakers couples the second output signal of the first and second pilot relays to the first and second circuit breakers, respectively, to cause the circuit breakers to disconnect the protected section of the distribution network if the differential current between the first and second ends of the protected section exceeds a predetermined limit.

The features of the invention believed to be novel are set forth with particularity in the appended claims. The invention, itself, however, both as to its organization and method of operation, together with further objects and advantages thereof, may be best understood by reference to the following description taken in conjunction with the accompanying drawing.

DETAILED DESCRIPTION OF PREFERRED EMBODIMENT

Figure 1:
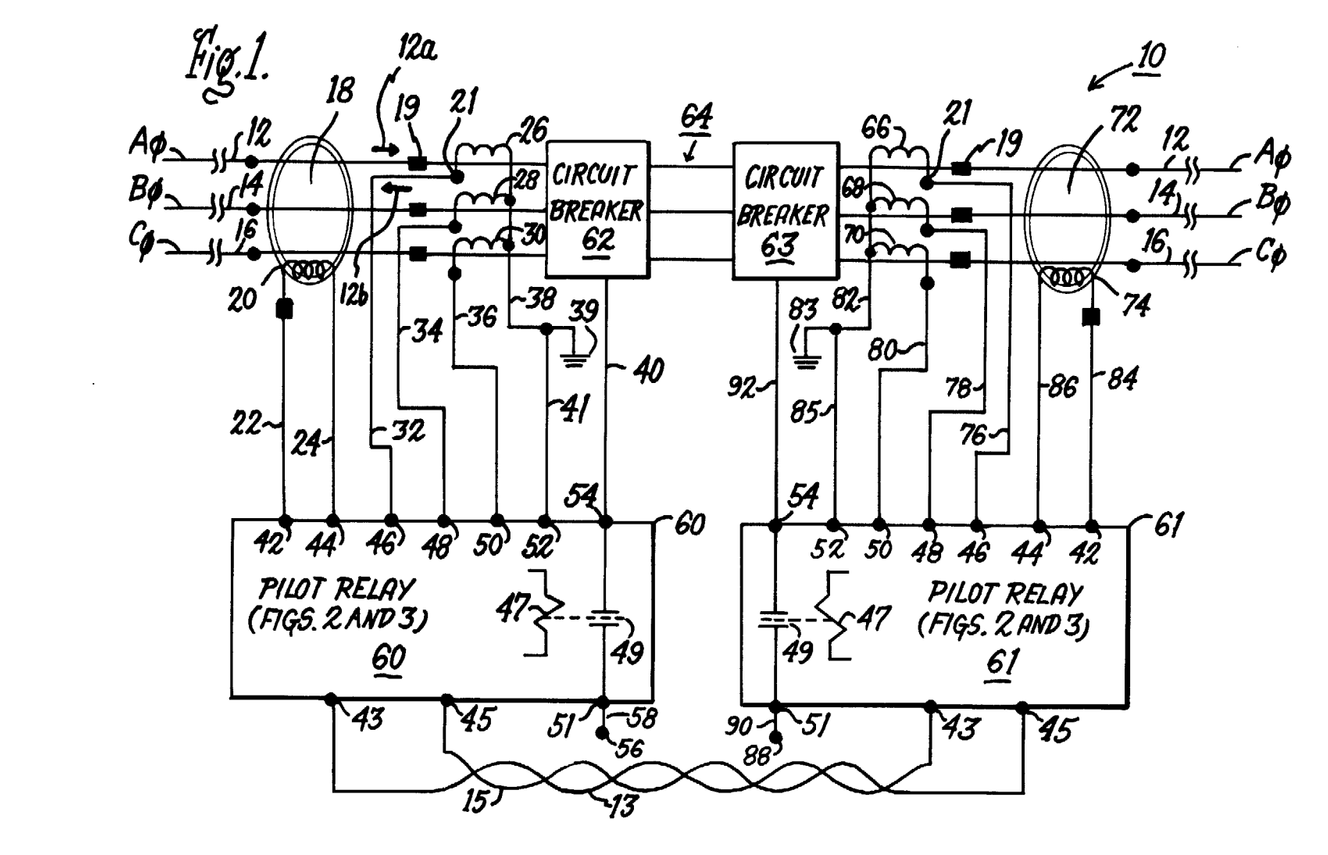
FIG. 1 is a block diagram of a pilot relay protection system embodying one form of the present invention.

Referring now to FIG. 1 there is shown a three phase high voltage electrical distribution network comprising three transmission lines 12, 14, and 16 which constitute phases A, B, and C, respectively, of the network. The electrical distribution network has a section 64 protected by a pilot wire relay protection system 10 of the preferred embodiment. Arranged on opposite ends of the protected section 64 are conventional power circuit breakers 62 and 63 responsive to an electrical signal. A pilot relay 60 is arranged in proximity to circuit breaker 62. Similarly, a pilot relay 61, having the same structure and operation as pilot relay 60, is arranged in proximity to circuit breaker 63.

Pilot relay 60 has connected to its input circuit four current sensors 20, 26, 28 and 30. Similarly, pilot relay 61 has connected to its input circuit four current sensors 74, 66, 68 and 70. Current sensors 26, 28, 30, 66, 68, and 70, may typically be current transformers of the type JAG-O supplied by Instrument and Meter Department of General Electric Company located in Somersworth, New Hampshire 03878. Current sensors 20 and 74 may typically be current transformers of the type JCG-O supplied by Instrument and Meter Department of General Electric Company also located in Somersworth, New Hampshire 03878.

Current transformers 26 and 66, 28 and 68, and 30 and 70, are arranged to develop coupled currents representative of the current flowing within the transmission lines 12, 14, and 16 respectively. The polarity arrangement of the current transformers 20, 26, 28, 30, 66, 68, 70, and 74 with respect to the transmission lines 12, 14, and 16, is shown in FIG. 1 by the use of a solid rectangle 19 and a solid circle 21. The solid rectangle 19, shown in FIG. 1, near the circuit breaker 62 indicates that the normal current flow in the transmission lines 12, 14, and 16 is into current transformer 26, 28 and 30 whereas the solid rectangle 19, shown in FIG. 1, near circuit breaker 63 indicates that the normal current flow in the transmission lines 12, 14 and 16 is away from the current transformers 66, 68 and 70. It should be recognized that the direction of flow of the normal currents periodically reverses due to the alternating current source of the electrical distribution network. The solid circles 21, shown in FIG. 1, near current transformers 20, 26, 28, 30, 66, 68, 70 and 74 indicate the direction of current flow in the primary winding of each transformer 20, 26, 28, 30, 66, 68, 70 and 74. The polarity relationship of the solid rectangles 19 and the solid circles 21 is best shown in FIG. 1 near current transformer 26. The normal current in transmission line 12 is shown as an arrow 12a flowing toward solid rectangle 19 and the normal coupled current of the current transformer 26 is shown as an arrow 12b flowing away from the solid circle 21. The selection of the current transformers should be such that the developed coupled current of 26, 28, and 30, is substantially equal to the developed coupled current of 66, 68 and 70 respectively. Current transformers 20 and 74 each have a central portion 18 and 72, respectively, which is positioned about a section common to all three transmission lines 12, 14 and 16 as shown in FIG. 1. The central portions 18 and 72, having internally positioned transmission lines 12, 14 and 16, forms the primary winding of current transformers 20 and 74 respectively.

Current transformers 26, 28 and 30 have a first and a second terminal. The second terminals of the current transformers 26, 28 and 30 are connected together via a conductor 38 which is further connected to a system ground return 39 located in proximity to circuit breaker 62. The system ground return 39 is further connected to a terminal 52 of pilot relay 60 via a conductor 41. Similarly, current transformers 66, 68 and 70 have a first and a second terminal. The second terminal of the current transformers 66, 68 and 70 are connected together via a conductor 82 which is further connected to a system ground return 83 located in proximity to circuit breaker 63. System ground return 83 is further connected to a terminal 52 of pilot relay 61 via a conductor 85. The first terminals of current transformers 26, 28 and 30 have one end of conductors 32, 34, and 36 connected, respectively, and the other ends of the conductors 32, 34, and 36 are connected to pilot relay 60 via terminals 46, 48 and 50 respectively. Similarly, the first terminals of current transformer 66, 68, and 70, have one end of conductors 76, 78, and 80 connected, respectively, and the other ends of conductors 76, 78, and 80 are connected to pilot relay 61 via terminals 46, 48, and 50 respectively.

Current transformers 20 and 74 each have a first and a second terminal. The first and second terminals of current transformer 20 are connected to terminals 42 and 44 of pilot relay 60, via conductors 22 and 24 respectively. Similarly, the first and the second terminal of current transformer 74 are connected to pilot relay 61 terminals 42 and 44 via conductors 84 and 86.

Pilot relay 60 is interconnected to pilot relay 61 via a twisted, shielded pair of conductors 13 and 15 which are connected between terminals 43 and 45 of pilot relay 60 and pilot relay 61. The length of conductors 13 and 15 is dependent upon the distance between circuit breakers 62 and 63. Conductor 13 and 15 will hereinafter be referred to as pilot wires 13 and 15.

Circuit breakers 62 and 63 are responsive to an electrical signal applied to conductors 40 and 92, respectively, by pilot relays 60 and 61 respectively. The application of an electrical signal to conductors 40 and 92 causes circuit breakers 62 and 63, respectively, to disconnect the protected section 64 from the transmission lines 12, 14 and 16. Pilot relays 60 and 61 control the application of an electrical signal to conductors 40 and 92, respectively, by energizing a relay coil 47 located within each pilot relay 60 and 61. Energizing relay coil 47 of pilot relay 60 or 61 closes its normally open contact 49. Closure of contact 49 of relay 60 conducts an electrical signal, such as 125 V DC from a source of electrical energy (not shown) via a terminal 56, a conductor 58 and a terminal 51 of pilot relay 60, to terminal 54 of pilot relay 60 and to the conductor 40 of circuit breaker 62. Similarly, closure of contact 49 of relay 61 conducts an electrical signal, such as 125 V DC from a source of electrical energy (not shown) via a terminal 88, a conductor 90 and a terminal 51 of pilot relay 61, to terminal 54 of pilot relay 61 and to the conductor 92 of circuit breaker 63.

Figure 2:
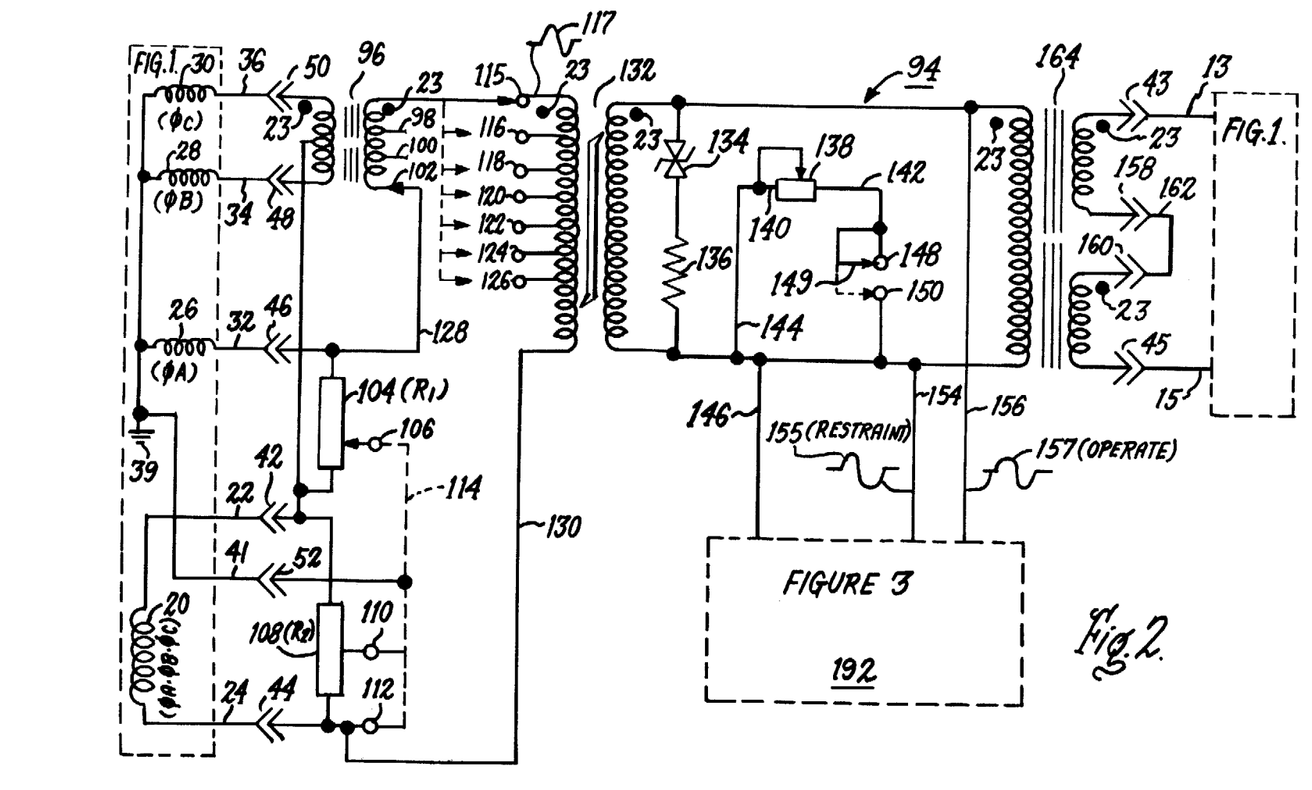
FIG. 2 is a circuit diagram of transformer network of the pilot relay.

Reference is now made to FIG. 2 to further describe pilot relays 60 and 61. Pilot relays 60 and 61 are responsive to the coupled current of the current transformers 20, 26, 28, 30 and 66, 68, 70 and 74, respectively. FIG. 2 shows an analog type transformer network 94 which is located within each pilot relay 60 and 61. As previously mentioned, pilot relays 60 and 61 are substantially identical and therefore transformer network 94 of pilot relay 60 need be only discussed. Transformer network 94 performs four functions; (1) combines the coupled currents from current transformers 20, 26, 28 and 30 into a composite signal 117 which is applied across the primary winding of transformer 132 via one of a plurality of terminals 115, 116, 118, 120, 122, 124 and 126 and a conductor 130; (2) limits the voltage level of composite signal 117 present at the secondary winding of transformer 132; (3) provides a signal to the pilot wires 13 and 15 via transformer 164; and (4) generates a restraint signal 155 and an operate signal 157.

Transformer network 94 is mainly comprised of the electrical components listed in Table 1.

TABLE I

| Component | Type | Manufacturer |
|---|---|---|
| Center-tapped gapped-core transformer 96 | 0367A0278G5 | General Electric Co., Phila. |
| Saturation transformer 132 | 0367A0600G2 | General Electric Co., Phila. |
| Transformer 164 | 0367A0279G15 | General Electric Co., Phila. |
| Zener diode 134 | 1N1817C | Motorola Semiconductor |
| Resistor 136 | Type 270 | Ohmite Mfg. Co. |
| Resistor 152 | CG-6 | Charles T. Gamble Industries |
| Rheostat 104 | GE Drawing Number 0246A9131 Part 1 | " |
| Tapped resistor 108 | GE Drawing Number 0246A9129 Part 4 | " |
| Rheostat 138 | Type 210 | Ohmite Mfg. Co. |

The portion of the transformer network 94 that generates a composite signal 117 is mainly comprised of the center-tapped transformer 96, the saturation transformer 132, the rheostat 104 and the tapped resistor 108.

Solid circles 23, shown in FIG. 2, are polarity markers of primary and secondary windings of transformers 96, 132 and 164. The solid circles 23 shown on the primary winding of transformers 96, 132 and 164 indicate that the current flowing toward the transformer on the marked (23) primary side corresponds to the current flowing away from the transformer in the marked (23) secondary side. The broken lines located between the primary and secondary windings of transformer 96 and shown to represent transformer 96 as being an air gapped-core type transformer. The bar figure having chisel type ends, located between the primary and secondary windings of transformer 132, is shown to represent transformer 132 as being a saturation transformer in which the output current of the secondary winding reaches a maximum saturation value upon the application of a predetermined amount of current to the primary winding, whereby further increases in the primary current do not increase the saturation current value of the secondary winding. The transformers 96 and 132 are arranged to combine the currents coupled by current transformer 20, 26, 28, and 30 into the composite signal 117. The rheostat 104 and 108 are arranged to adjust the amount of coupled current from current transformer 20, 26, 28 and 30 that is supplied to transformers 96 and 132.

The coupled current from current transformer 30, representative of the phase C current at one end of the protected section 64, is connected to the high side of the primary winding of transformer 96 via the conductor 36 and the terminal 50 of the pilot relay 60. The coupled current from current transformer 28, representative of the phase B current at one end of the protected section 64, is connected to the low side of the primary winding of transformer 96 via the conductor 34 and the terminal 48 of the pilot relay 60. The coupled current from current transformer 26, representative of the phase A current at one end of the protected section 64, is connected to the low side of the secondary winding of transformer 96 via the conductor 32, the terminal 46 of pilot relay 60, a conductor 128 and one of the terminals 102, 100 or 98 of the transformer 96. Current transformer 26 is also connected to one end of rheostat 104 via the terminal 46. The coupled current from current transformer 20, representative of the vector summation of phases A, B, and C currents at one end of the protected section 64, is connected across the tapped resistor 108 via terminals 42 and 44 of the pilot relay 60. Terminal 44 is further connected to the low side of the primary winding of the transformer 132 via a conductor 130. Also, one side of current transformer 20 is connected to the center-tap of the primary of transformer 96 and to the lower end of rheostat 104, both connections being via the terminal 42. The system ground return 39 is connected to a conductor 114 via the conductor 41 and the terminal 52 of the pilot relay 60. Conductor 114 may be connected to an adjustable contact arm 106 of rheostat 104 or may be connected to the tapped resistor 108 via one of the terminals 110 or 112 of resistor 108. Rheostat 104 and tapped resistor 108 will later be referred to as R1 and R2 respectively.

The arrangement of transformers 96 and 132 in conjunction with resistors R1 and R2 operates to produce a composite signal 117 at the primary winding of transformer 132. The composite signal 117 is a vectorial summation of the coupled currents of transformers 26, 28 and 30, representative of phase currents A, B and C, respectively, and the coupled current of transformer 20 representative of all three phases $\phi A$, $\phi B$ and $\phi C$. The coupled currents of transformers 26, 28, 30 and 20 will later be referred to as CA, CB, CC, and CABC respectively. The composite signal 117, herein termed CS117, may be represented by the following relationship;

$$CS117 = 1.622CA + 1.427CB + 1.817CC + 1.49CABC \quad (1)$$

Equation (1) is based on the connections of wire 128 to terminal 102 and wire 114 to terminal 112. These connections will be further discussed hereinafter.

The portion of the transformer network 94 that limits the voltage level of composite signal 117 impressed across the secondary winding of the transformer 132 is mainly comprised of the zener diode 134 and the resistor 136. Zener diode 134 and resistor 136 are serially connected and positioned in a shunt arrangement with respect to the secondary winding of transformer 132. The zener diode 134 having a typical conduction voltage of 15 volts and the resistor 136 having a typical resistive value of 3 ohms are chosen to limit the magnitude of composite signal 117 impressed across the secondary winding of transformer 132 to a voltage having a typical value of 15 volts.

The composite signal 117 impressed across the secondary winding or output of transformer 132 is used to provide three functions; (1) the restraint signal 155; (2) the operate signal 157 and (3) an input signal routed across the secondary windings of transformer 164. The primary or input winding of transformer 164 is connected across terminals 45 and 43 of pilot relay 60. As previously discussed terminals 43 and 45 are connected to pilot wires 13 and 15 which interconnect the pilot relay 60 to the pilot relay 61. If desired, an external device (not shown) may be connected to terminal 158 and 160 of transformer 164 to monitor the condition of the pilot wires 13 and 15. This preferred embodiment will not describe such a device and therefore these terminals 158 and 160 are shown interconnected with a jumper wire 162. As will be discussed hereinafter with regard to the overall operation of the pilot wire relay protection system 10, the voltage and current levels present on pilot wire 13 and 15 are monitored by each pilot relay 60 and 61 to determine if a fault condition exists in the protected section 64 of the electrical distribution network.

The voltage level of the two analog type signals, restraint signal 115 and operate signal 157 are both referenced to a conductor 146 which is connected to the low side of saturation transformer 132. The operate signal 157 is further connected to the high side of saturation transformer 132, and therefore the voltage level of operate signal 157 is the voltage level impressed across the output of transformer 132. The restraint signal 155 is further connected to one arm of a resistor-network formed by a parallel arrangement of a resistor 152 and a potentiometer 138. Potentiometer 138 is further connected via a conductor 142 to a terminal 148 which may be selectably connected to a terminal 150 via a switch arm 149. Terminal 150 is connected to one end of resistor 152. Potentiometer 138 has a typical resistance range from 0 to 50 ohms. Resistor 152 has a typical value of 5 ohms. The voltage level of restraint signal 155 is determined by the voltage drop from conductor 146 to terminal 150. If switch arm 149 is not selected to terminal 150 the voltage level of the restraint signal 155 is determined by the resistance of resistor 152. However, if switch arm 149 is connected to terminal 150 the voltage level of restraint signal 155 is determined by the parallel resistance of resistor 152 and potentiometer 138. The restraint signal 155 may be reduced from 0 to 30 percent by adjusting potentiometer 138. Therefore, the voltage level of the restraint signal 155 may be controlled by the selection of resistor 152 and the selection of resistor 152 in conjunction with the adjustment of potentiometer 138. The analog type signals comprising the restraint signal 155 and the operate signal 157, both referenced to conductor 146, are routed to the electronic means 192 via conductors 154, 156 and 146.

Figure 3:
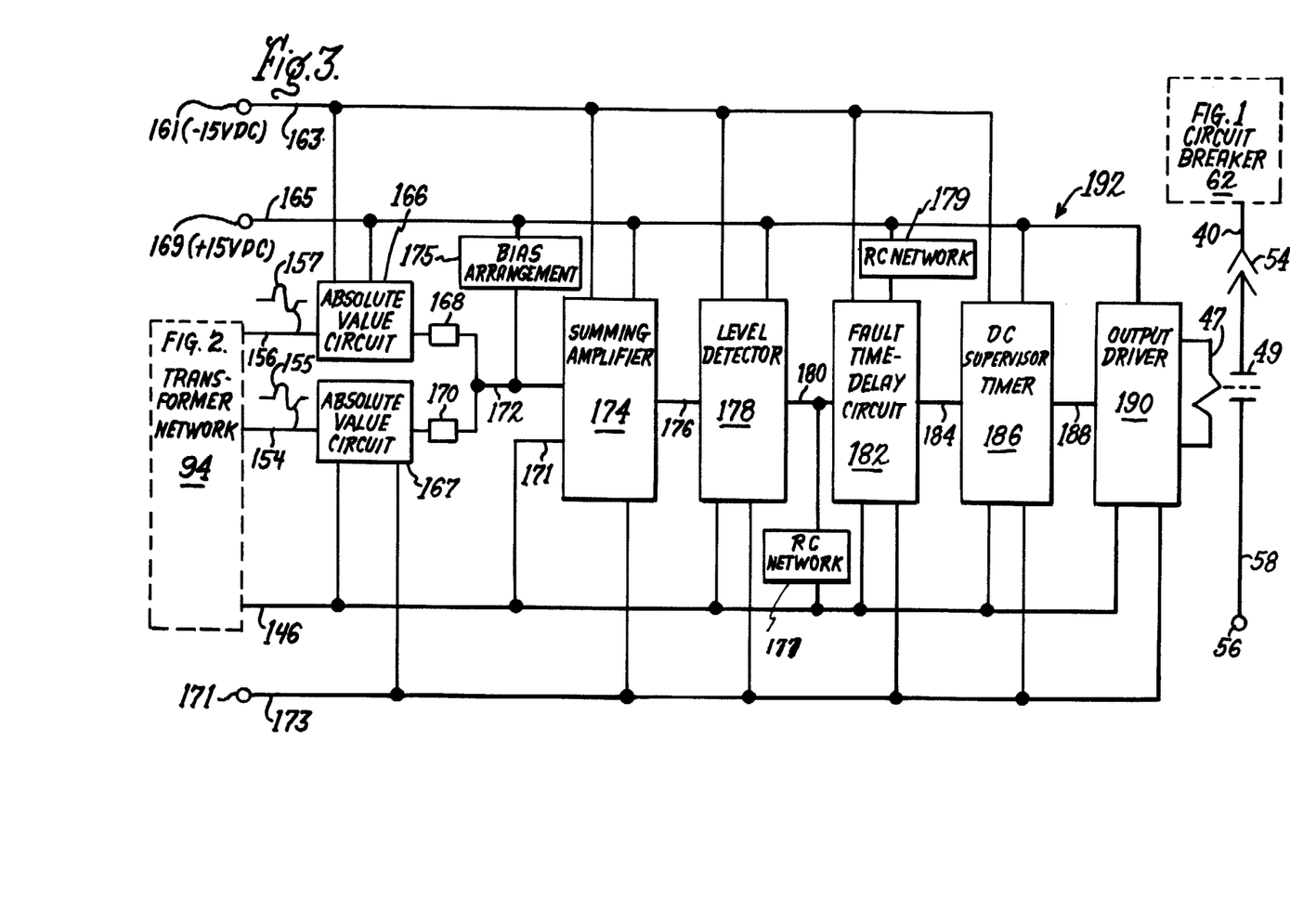
FIG. 3 is a block diagram of the electronic means operating in conjunction with the transformer network of FIG. 2.

Electronics means 192, shown in FIG. 3, compares a portion of the voltage level of the operate signal 157 against a portion of the voltage level of the restraint signal 155 to determine if a predetermined voltage difference exists which is indicative of a fault condition. Electronic means 192 is mainly comprised of an absolute value circuit 166, an absolute value circuit 167, a summing amplifier 174, a level detector 178, a fault time delay circuit 182, a d.c. supervisor timer 186 and an output driver 190. The d.c. supply voltages for electronic means 192 are typically +15 VDC and −15 VDC both referenced to a ground potential. The +15 VDC, the −15 VDC and the ground potential are supplied to electronic means 192 via terminal 169—power bus 165, terminal 161—power bus 163 and terminal 171—ground bus 173 respectively.

The following description for absolute value circuits 166 and 167, the summing amplifier 174, the level detector 178, the d.c. supervisor timer 186 and the output driver 190 will only discuss the functions and the desirable voltage levels achieved by each of these circuits. These circuits are conventional types and therefore the details of their circuit operation is not described. For a detailed description and operation of similar conventional circuits reference may be made to a textbook entitled, "APPLICATION OF OPERATIONAL AMPLIFIERS", Third-Generation Techniques, by J. G. Grame published in 1973 by McGraw-Hill Book Company.

The absolute value circuits 166 and 167 are circuits that rectify and filter the operate signal 157 and the restraint signal 155 respectively. It should be noted that the filtering function of circuits 166 and 167 is a desirable function but if not incorporated the electronic means 192 would continue to operate even though in a somewhat degraded manner. The input stage of the absolute value circuits 166 and 167 each have an input resistor to perform a scaling function by which the operate signal 157 feed into absolute value circuit 166 is substantially reduced by a factor of at least 10 to 1 relative to the restraint signal 155 feed into absolute value circuit 167. The scaling function between the operate and restraint signals 157 and 155, respectively, allows the electronics means 192 to be more sensitive in its response to changes in the restraint signal 155 relative to the operate signal 157. The output of the absolute value circuit 166 is connected to one end of a resistor 168. Similarly, the output of the absolute value circuit 167 is connected to one end of a resistor 170. The output signals of absolute value circuits 166 and 167 are combined by connecting the second ends of resistors 168 and 170 together. The combined signal is routed as an input to the summing amplifier 174 via signal path 172.

The input 172 to summing amplifier 174 is further connected to a predetermined d.c. voltage having a typical value of 4 volts provided by a bias arrangement 175. The voltage level present at input 172 is the difference between predetermined d.c. voltage of bias arrangement 175 and the combined voltage signal of absolute value circuits 166 and 167. Summing amplifier 174 performs an algebraic sum of the outputs of 166, 167 and 175 at output 176 which is applied to a level detector 178.

If the input 176 to level detector 178 exceeds a predetermined voltage typically in the range of 0 to 0.1 volts, level detector 178 produces a d.c. output signal on conductor 180 which is applied to the fault-time delay circuit 182.

Fault time delay circuit 182 provides two functions: (1) it delays the occurrence of an output signal on signal line 184 until the output from level detector 178 is present for a time duration typically of 5 milliseconds, and (2) it delays the removal of its output signal on signal line 184 until a time duration, typically of 5 milliseconds, has elapsed from the cessation of output signal 184. The delay of the initial output of time delay circuit 182 may be varied or adjusted by an RC network 177 connected at the input 180 of fault time delay circuit 182. The RC network 177 adjusts or varies the speed of response of circuit 182 within a range of 2 to 15 milliseconds. Similarly, the delay for the removal of the output of fault time delay circuit 182, may be varied or adjusted by an RC network 179 connected to an output stage (not shown) of circuit 182. RC network 179 varies or adjusts the minimum time, in the range of 2 to 15 milliseconds.

The D.C. supervisor timer 186 is interconnected between the fault time delay 182 and the output driver 190. The purpose of the D.C. supervisor timer 186 is to inhibit the output signal on signal line 184 from fault time-delay 182 from being applied to the input 188 of output driver 190 until a predetermined time delay, in the order of 50 to 100 milliseconds, has expired from the application of the D.C. supply voltages +15 VDC and −15 VDC via terminals 169 and 161 respectively. The d.c. supervisor timer 186 prevents misoperation during possible transient removal of the D.C. supply voltages +15 VDC and −15 VDC. The time delay of the d.c. supervisor timer 186 does not form part of the time delay of fault time-delay circuit 182. It should be recognized that d.c. supervisor timer 186 performs an advantageous function but if desired it need not be incorporated and the pilot wire relay protection system 10 would continue to operate properly even though its susceptibility to misoperation due to transients may increase. The d.c. supervisor timer 186 may be of a conventional R.C. network arranged to provide a desired time delay in the order of 50 to 100 milliseconds.

The allowance by d.c. supervisor timer 186 of an electrical signal on signal path 188 actuates the output driver 190 which in turn causes the previously discussed relay coil 47 to be energized.

Reference is now made to FIG. 1 to describe the overall operation of the pilot wire relay protection system 10. Pilot relay 60, in conjunction with current transformers 20, 26, 28 and 30 and 74, measures the current in proximity to circuit breaker 62 entering into protected section 64. Conversely, pilot relay 61, in conjunction with current transformers 74, 66, 68 and 70, measures the current in proximity to circuit breaker 63 leaving the protected section 64. If a predetermined difference between the current entering and leaving the protected section 64 is exceeded then an undesirable path or fault exists in the protected section 64. One of the inventive concepts of the pilot wire relay protection system 10 of the preferred embodiment is to accurately determine when the predetermined difference is exceeded. A major contributor to the accuracy of operation of any pilot wire relay protection system, such as the pilot wire relay protection system 10, is the accuracy at which the currents within the protected section 64 are sensed by the current transformers 20, 26, 28, 30, 66, 68, 70 and 74.

As discussed in the "Background" section, relatively high currents may occur during a fault in a high voltage power network comprised of transmission lines such as 12, 14 and 16. The high currents may prevent a current transformer from producing a signal output that is an accurate representation of the condition of the transmission line of which it monitors. A current transformer may have its internal magnetic state altered by a high current, and the alteration may remain after the high current which produced the alteration has ended. Such a current transformer with an altered magnetic state may subsequently be unable to produce a signal output which is accurately representative of its input. Furthermore, since it is typical to have three current transformers in a protection system each sensing the condition of a respective transmission line such as 12, 14 or 16 related to a protected section such as 64, the inaccuracy problem may be increased because each current transformer may have somewhat altered characteristics and therefore three different output signals may be supplied from these current transformers even though the condition of each of the transmission lines be substantially the same.

The pilot wire protection system 10 of this invention greatly improves the accuracy for detecting low current ground faults by having separate ground current sensing current transformer 20 and 74 each arranged across a portion of each transmission line 12, 14 and 16. The separate current transformers 20 and 74 for monitoring the ground condition of transmission lines 12, 14, and 16 are used in conjunction with the current transformer 16–66, 28–68, and 30–70 arranged across transmission lines 12, 14 and 16, respectively, to provide for more accurate protection for the protected section 64 than has previously been realized.

The ground current sensing current transformers 20 and 74 have a central portion 18 and 72 respectively. All three transmission lines 12, 14 and 16 pass through the central portions 18 and 72 and jointly form the primary winding of current transformers 20 and 74 respectively. The arrangement of three transmission lines 12, 14, 16 forming part of the primary winding of current transformers 20 and 74 results in a more accurate output from these transformers 20 and 74 than was previously realized from an arrangement of separate current transformers individually positioned across separate transmission lines. The amount of coupled current developed by current transformers 20 and 74 is representative of the total or composite current flowing within all three transmission lines 12, 14 and 16. Upon the occurrence of a fault within protected section 64, such as a phase-phase fault, an increased amount of current flowing within transmission line 12, 14 or 16 toward the location of the fault is opposed by an increased amount of current flowing within transmission line 12, 14 or 16 away from the location of the fault such that the net result of current as developed by current transformers 20 or 74 remains substantially zero. It has been empirically determined that phase-to-phase or three-phase faults that may occur in a section of a high voltage power system, such as protected section 64, produce currents whose net effect on current transformers 20 and 74 is substantially zero. Furthermore, the currents produced by the phase-phase and three phase faults do not tend to saturate or magnetize these current transformers 20 and 74. Still further, it has been empirically determined that the arrangement of current transformers 20 and 74 allows these current transformers to sense relatively low current ground faults in the order of 50 amperes which is a substantial reduction to the typical 400 amperes of current normally flowing during a ground fault in a high voltage power network which supplies power to a typical industrial system. Accordingly, this invention allows for the use of a power limiting resistor, which is normally installed at the neutral of the supply transformer of the high voltage power system, to limit the maximum ground current to a value in the order of 50 amperes. Reducing the maximum ground current from 400 amperes to 50 amperes correspondingly reduces the possible damage that may occur during a ground fault. Furthermore, the current transformers 20 and 74 may be small and inexpensive because the current rating of these transformers need only be 50 amperes instead of the previously desired 400 ampere rating and because these transformers 20 and 74 are not affected by the large phase-to-phase and three-phase fault currents which may occur. It should now be appreciated that this invention provides a pilot wire protection system 10, having separate ground current sensing transformers 20 and 74, that allows a more accurate determination of the condition of the protected section 64 with regard to detecting ground faults. The improvement provided by current transformers 20 and 74 further allows the pilot wire relays 60 and 61 to be more sensitive to their response to possible fault conditions within the protected section 64.

The overall operation of the pilot relays 60 and 61 is as follows, (1) each of the pilot relays 60 and 61 develops a composite signal 117, shown in FIG. 2, which is representative of the condition of the currents at a first and a second end of the protected section 64, (2) each of the pilot relays 60 and 61 develops an output signal, indicative of composite signal 117, which is applied to pilot wires 13 and 15, and (3) if the voltage and the current levels on the pilot wires 13 and 15 exceed predetermined levels then each of the pilot relay 60 and 61 energize relay coil 47 which in turn cause the circuit breaker 62 and 63, respectively, to disconnect the protected section 64 from the remainder of transmission lines 12, 14, and 16.

The voltage and current levels present on pilot wires 13 and 15 are monitored by each pilot relay 60 and 61 to differentiate between faults external to the protected section 64 and faults internal to the protected section 64. External or internal faults may be phase to phase faults related to phases φA, φB and φC, phase to phase to ground faults related to phases φA, φB and φC, three-phaase faults that are common to all phases φA, φB and φC, and phase to ground faults related to phases φA, φB and φC. Pilot relays 60 and 61 operate to energize circuit breakers 62 and 63, respectively, for internal type faults but do not energize circuit breakers 62 and 63, respectively, for external faults.

The pilot wires 13 and 15 interconnect the output transformer 164, most clearly seen in FIG. 2, of each pilot relay 60 and 61. Pilot wires 13 and 15 form a loop in which the voltage potential between pilot wires 13 and 15 is the total voltage differential between the output transformers 164 of the pilot relays 60 and 61. The current flowing within the loop formed by pilot wires 13 and 15 is directly proportional to the sum of the voltage potentials applied to pilot wires 13 and 15 by relays 60 and 61. When an external fault occurs, the voltages at transformers 164 produced by both relays 60 and 61 are equal in magnitude but opposite in polarity and produce a relatively large current flow in pilot wires 13 and 15. The total voltage potential between pilot wires 13 and 15 for an external fault is low since the polarity of the voltage across each transformer 164 is of an opposite polarity with respect to the other. The pilot relays 60 and 61 do not operate under these conditions of low pilot wires 13 and 15 voltage differential and high pilot wires 13 and 15 current flow. The condition sensed by pilot relays 60 and 61 for an external fault is similar to the condition sensed by pilot relays 60 and 61 during the normal flow of current to a load located external to the protected section 64 and therefore the pilot relays 60 and 61 also do not operate for this normal current flow condition.

When an internal fault occurs, the voltage at one transformer 164 of pilot relay 60 or pilot relay 61 increases in magnitude while the other transformer 164 of pilot relay 61 or pilot relay 60 also increases in magnitude and reversed in polarity. The increased voltages at transformers 164 now oppose current flow and therefore the current flow within pilot wires 13 and 15 is relatively low even though the voltage differential between pilot wires 13 and 15 has increased from its normal condition. Pilot relays 60 and 61 both sense the relative increase in voltage, with respect to the voltage which may be manifested by an external fault, and the relative decrease in current, with respect to the current which may be manifested by an internal fault, within pilot wires 13 and 15. The relative increase in voltage and relative decrease in current causes a predetermined voltage difference between the restraint signal 155 and operate signal 157 to be exceeded which in turn causes electronic means 192 to energize its relay coil 47 thus closing contacts 49. Closure of relay contact 49 of pilot relays 60 and 61 in turn cause circuit breakers 62 and 63, respectively, to disconnect protected section 64 from the remainder of transmission lines 12 14, and 16. To more clearly understand the overall operation of the pilot wire protection system 10, with regard to the level of current generated by the fault conditions to which pilot relays 60 and 61 respond, further details of transformer network 94, shown in FIG. 2, will now be discussed.

As previously discussed relays 60 and 61 each having a transformer network 94 are substantially identical. Therefore, the transformer network 94 of pilot relay 60 will only be described although the following description is also applicable to transformer 94 of pilot relay 61. Transformer network 94 is provided with the means by which the level of currents individually sensed by current transformers 20, 26, 28, 30 for pilot relay 60 may be varied to accommodate various conditions. In particular, transformer network 94 is provided with: the saturation transformer 132 with a primary winding having taps 115, 116, 118, 120, 122, 124 and 126, the transformer 96 with a secondary winding having taps 98, 100 and 102, rheostat 104 (R1), tapped resistor 108 (R2) and the potentiometer 138.

The input current from the current transformers 20, 26, 28 and 30 required to operate pilot relay 60 is dependent upon the following selection of the various components of transformer network 94 related to the following functions given in Tables II, III, IV, and the following equation (2).

Table II is a tabulation of component controls versus the variable functions which are being controlled.

TABLE II

| Component | Function |
|---|---|
| Tap Selection of Transformer 132 | Three-Phase Pickup Value given in Amperes |
| 115 | 4 |
| 116 | 5 |
| 118 | 6 |
| 120 | 7 |
| 122 | 8 |
| 124 | 10 |
| 126 | 12 |
| Tap Selection of Transformer 96 | Varies the sensitivity to three phase fault current |
| 98 | A-B |
| 100 | B-C |
| 102 | C-A |
| Rheostat 104 | Varies the phase-ground fault current required |
| Tapped resistor 108 | Varies the phase-ground fault current required |
| Potentiometer 138 | Varies the sensitivity of the restraint circuit |

Table III is a tabulation of the pickup current in percent of the three phase pickup current value, of the tap selections 98, 100 and 102 of transformer 96 related to the type of fault detected by the pilot wire relay protection system 10. The percentage values given for taps 100 and 102 are with respect to a three phase fault with transformer 96 connected using tap 102.

TABLE III

| Type of Fault | Tap Selection of Transformer 96 | | |
|---|---|---|---|
| | Tap 98 | Tap 100 | Tap 102 |
| A-B | 100% | 90% | 86% |
| B-C | 100% | 65% | 53% |
| C-A | 100% | 90% | 86% |
| Three-Phase (3φ) Fault | Note 1 | 200% | 100% |

Note 1 -
The tap 98 selection of transformer 96 will not respond to balanced three phase (3φ) fault.

Table IV is related to phase-ground faults. Table IV gives two values of tapped resistor 108, shown as 110 and 112, having typical values of 0.78 ohms and 1.49 ohms respectively. The percentage value of pickup current for the two settings 110 and 112 are shown for each tap 98, 100 and 102 of transformer 96.

TABLE IV

| Type of Fault | Transformer 96 Tap Selection | | | | | |
|---|---|---|---|---|---|---|
| | Tap 98 | | Tap 100 | | Tap 102 | |
| | 110 | 112 | 110 | 112 | 110 | 112 |
| A-Ground | 23.4 | 12.5 | 23.4 | 12.5 | 23.4 | 12.5 |
| B-Ground | 27.1 | 13.5 | 27 | 13.5 | 26.3 | 13.4 |
| C-Ground | 27.1 | 13.5 | 27 | 13.5 | 22.3 | 13.4 |

The level of coupled current generated by different types of faults and developed by the current transformers 20, 26, 28 and 30 required to operate pilot wire relay 60 is given by the following relationship:

$$I = (T)(N)(P)(L)/100 \quad (2)$$

where

I is given in amperes

T = the three phase pickup value for taps 115–126 expressed in amperes according to Table II N = the number of pilot wire relays in the electrical distribution system which has been hereinbefore described as two (2) being pilot wire relays 60 and 61.

P = the percentage listed in Table III related to phase type faults for taps 98, 100 and 102 of transformer 96 and the percentage listed in Table IV related to ground type faults for transformer 96 and tapped resistor 108. For example, with the 102 tap selected for transformer 96 and the 110 resistive value selected for resistor 106, P will be 100 for a three-phase (3φ) fault, 86 for a phase C-A fault, and 23.4 for a phase A-Ground fault.

L = is a factor based on the pilot wires 13 and 15 characteristics. For typical twisted shielded conductors for pilot wires 13 and 15 of number 19 wire L may have a typical value of 1.0.

Pilot wire relays 60 and 61, having the hereinbefore described adjustability or flexibility to accommodate various conditions desired for the protection of the protection section 64, are also sensitive devices. The sensitivity of pilot relays 60 and 61 is mainly provided by electronic means 192. Pilot relays 60 and 61 operate when the voltage difference between the restraint signal 155 and operate signal 157 exceed a predetermined value determined by bias arrangement 175 of electronic means 192. As previously discussed the input resistors for absolute value circuits 166 and 167 are selected to scale down the operate signal 157 by a factor in the order of 10 with respect to the restraint signal 155. Bias arrangement 175 coupled to the combined outputs of absolute value circuits 166 and 167 establish the voltage difference between scaled down operate signal 157 and normal restraint signal 155 which when exceeded causes relays 60 and 61 to operate. Bias arrangement 175 is typically set to a value of 4.0 volts. The electronic means 192 being an electronic device senses the relatively low value difference for control of the circuit breakers 62 and 63.

Although the pilot wire relay protection system 10 has been hereinbefore described for usage in an electrical power network having three transmission lines 12, 14 and 16, it should be recognized that the pilot wire relay protection system 10 may also be used in an electrical power network having two transmission lines such as transmission lines 12 and 14. In a two transmission line environment current sensors 30 and 70 would not be utilized and therefore the hereinabove description relating to phase C of the electrical distribution network would not be applicable.

It should now be appreciated that pilot wire protection system 10 having the arrangement of current transformer 20, 26, 28, 30, 66, 68, 70 and 74 provides accurate detection of phase-phase, three-phase, phase-phase-ground, and phase-ground faults normally occurring in a high-voltage power network. Furthermore, it should now be appreciated that the pilot relays 60 and 61 provide the pilot wire protection system 10 with a device to accurately monitor the improved arrangement of the current transformers 20–74. Still further it should now be appreciated that the electronic means 192 provides the pilot wire relays 60 and 61 with a fast and accurate response to faults occurring within the protected section 64.

While the invention has been particularly shown and described with reference to several preferred embodiments thereof, it will be understood by those skilled in the art that various changes in form and detail may be made therein without departing from the true spirit and scope of the invention as defined by the appended claims.

What is claimed is:

1. A pilot wire relay protection system for protecting a section of a high voltage network located between first and second circuit breakers and comprising at least a first and a second transmission line each constituting a phase of said network, said pilot wire relay protection system detecting and responding to phase-to-phase faults, phase-ground faults and phase-phase-ground faults that may occur within the protected section by detecting and responding to an excessive differential current existing between a first and a second end of said protected section, said pilot wire relay protection system comprises:

a plurality of current sensors each coupled to a transmission line and arranged into a first group located at the first end of said protected section for respectively developing coupled currents representative of the transmission-line currents flowing at said first end of said protected section and a second group located at the second end of said protected section for respectively developing coupled currents representative of currents flowing at the second end of said protected section;

said first and second groups of current sensors having at least a first, a second, and a third current sensor respectively coupled to the first, the second, and the combination of the first and second transmission lines, said third current sensor developing a coupled current representative of the sum of currents flowing within the first and the second transmission lines at said third current sensors, so that upon the occurrence of a phase to phase fault within said protected section causing a relatively high current to flow within said protected section, said coupled current from the third current sensor will be representative of the difference between the transmission-line currents at said third current sensor flowing toward and away from the location of the fault, and such that the coupled current from the third current sensor will be substantially unchanged by the relatively high current flowing within either of the transmission lines of said protected section during the phase to phase fault, whereby said third current sensors remain unaffected by said phase-phase fault and thus able to provide a coupled current representative of the currents flowing within said transmission lines upon a simultaneous or subsequent occurrence of a phase-ground fault within said protected section;

each of said first, second, and third current sensors having a first and a second terminal, said first and said second current sensors of each group further having their second terminal connected together;

a first pilot relay coupled to said first and second terminals of each of the current sensors of said first group;

a second pilot relay coupled to said first and second terminals of each of the current sensors of said second group;

each of said pilot relays being responsive to coupled current from its associated current sensors for generating a first output signal representative of the composite of the current coupled from its associated first, second, and third current sensors;

pilot wire means comprising first and second conductors for coupling said first output signals together;

each of said first and said second pilot relays having further means for generating a second output signal if the current flowing within said first and said second conductors and the voltage difference between said first and said second conductor exceed predetermined limits; and means adapted to couple said second output signal of said first and said second pilot relays to said first and said second circuit breakers for causing said circuit breakers to disconnect the protected section from the remainder of the power network if the differential current between said first and said second ends of said protected section exceeds a predetermined limit.

2. A pilot wire relay protection system according to claim 1 wherein high voltage power network further includes a third transmission line constituting a third phase of said network, said pilot wire protection system further comprises:

a pair of fourth current sensors each coupled to said third transmission line and arranged into said first and second groups of current sensors for developing coupled current representative of the third transmission line currents flowing at said first and second ends of said protected section respectively, each of said fourth current sensor having a first and a second terminal, said second terminal of the fourth current sensor of each of the first and second groups respectively connected to said second terminal of the first and second current sensors of the first and the second group, said first and said second terminals of the fourth current sensor of each of the first and second group respectively coupled to said first and said second pilot relays;

said third current sensor being further arranged to develop a coupled current representative of the sum of currents flowing within the first, the second and the third transmission lines at said third current sensor so that upon the occurrence of a phase-phase or a three-phase fault within the protected section thereby causing a relatively high current flow within said protected section said coupled current from the third current sensor will be representative of the difference among the transmission-line currents at said third current sensor flowing toward and away from the location of the fault and such that the coupled current from the third current sensor will be substantially unchanged by the relatively high current flowing within the first, second or third transmission lines of the protected section during the phase-phase or three-phase fault, whereby said third current sensor remains unaffected by said phase-phase or three-phase fault and thus able to provide a coupled current representative of the current flowing within said transmission lines upon a subsequent occurrence of a phase-ground, phase-phase-ground or a phase-phase-phase-ground fault within said protected section, and;

said first and said second pilot relay means for generating a first output signal further including means for generating said first output signal representative of the composite of the current coupled from their associated first, second, third, and fourth current sensors.

3. A pilot wire relay protection system according to claim 2 wherein said third current sensor comprises;

a current transformer having a winding arranged about a portion of each of the first, second and third transmission lines, said portions of the first, second and third transmission lines forming a portion of the primary winding of said current transformer, so that upon the occurrence of a fault between a pair of transmission lines or a fault that is common to all transmission lines causing relatively high currents to flow within said protected section a change in the developed coupled representative of the transmission line current during the occurrence of the relatively high currents will be relatively small.

4. A pilot wire relay protection system according to claim 2 wherein each of said pilot relays means for generating a first ouput signal representative of the respective composite signal of each of the first and second groups of current sensors comprises;

a first transformer having a center-tapped primary winding and a secondary winding, each of said windings having a high and a low side, the high side of the primary winding coupled to said first terminal of said fourth current sensor of its respective group of current sensors, said fourth current sensor developing coupled current representative of said third transmission-line current constituting phase C, herein termed $\phi C$, at its respective end of said protected section, the low side of the primary winding coupled to said first terminal of said second current sensor of its respective group of current sensors, said second current sensor developing coupled current representative of said second transmission-line current constituting phase B, herein termed $\phi B$, at its respective end of said protected section;

a first and a second variable impedance means each having a first, a second and a third terminal, said second terminal of said second variable impedance means being connected to the connected together second terminals of its respective group of current sensors, said first terminal of said first variable impedance means coupled to said low side of said secondary winding of said first transformer and also coupled to said first terminal of said first current sensor of its respective group of current sensors, said first current sensor developing coupled current representative of said first transmission-line current constituting phase A, herein termed $\phi A$, at its respective end of said protected section, said first terminal of said second variable impedance means coupled to said second terminal of said first variable impedance means and to the center-tap of said primary winding, and also coupled to said first terminal of said third current sensor of its respective group of current sensors, said third current sensor developing a coupled current representative of said first, second and third transmission-line currents constituting phases A, B, and C, respectively, at its respective end of said protection section, said second terminal of said second variable impedance means coupled to said second terminal of said third current sensor of its respective group of current sensors, whereby said arrangement of said first and second variable impedance means develop a first, a second, and a third voltage, said first voltage, herein termed $X_1$, being developed across said first and second terminals of said first variable impedance means and having an amplitude determined by the impedance betwen the first and second terminals of said first variable impedance means, said second voltage, herein termed $X_2$, being developed across said second and third terminals of said second variable impedance means and having an amplitude determined by the impedance between the second and third terminals of said second variable impedance means said third voltage, herein termed $X_3$, being developed across said first and second terminals of said second variable impedance means and having an amplitude determined by the impedance betwen the first and second terminals of said second impedance means;

a saturation transformer having a variable tapped primary winding with a high and a low side and a secondary winding having a high and a low side, said low side of said primary winding coupled to said third terminal of said first variable impedance means, said high side of said primary winding being coupled to said high side of said secondary winding of said first transformer;

said arrangement of said first transformer, aid first and second variable impedance means, and said saturation transformer generating said composite signal, herein termed CS, applied across said secondary winding of said saturation transformer and representative of a vector sum of the developed coupled current of the first, second, third and fourth current sensors according to the following relationship;

$$CS = K1\phi A + K2\phi B + K3\phi C + K4\phi A - \phi B - \phi C$$

wherein K1, K2, K3 and K4 are constants determined by the turns ratio of said first transformer and the resistance values of said first and second variable impedance means;

said secondary winding of said saturation transformer being further arranged across a voltage limiting means comprising a serially connected first resistor and a zener diode having values selected to limit the composite signal across the secondary winding of the saturation transformer to a predetermined voltage.

5. A pilot wire relay protection system according to claim 4 wherein said first output signal being coupled to each other by pilot wire means having said first and said second conductor further includes;

an isolation transformer located within each of said pilot relays having a primary winding coupled across said secondary winding of said saturation transformer having applied across it said composite signal, and further having a secondary winding coupled across said first and said second conductor of said pilot wire means, said secondary winding of said isolation transformer having an operate signal representative of a differential signal developed between the composite signal of each pilot relay.

6. A pilot wire relay protection system according to claim 5 wherein each of said pilot relay means for generating a second output signal comprises;

a resistor network having a first, a second and a third terminal, said first terminal coupled to the low side of the secondary winding of the saturation transformer and also further coupled to one end of a second resistor and a first terminal of third variable resistor having a resistance between said first terminal and a second terminal being adjustable by positioning an arm of said variable resistor, said second terminal of the resistor network coupled to the second end of said second resistor and a low side of said primary winding of said isolation transformer, said resistor network having means for selectably connecting said second terminal of said resistor network to said second terminal of said third variable resistor, whereby positioning the arm of said third variable resistor adjusts the amplitude of a restraint signal developed across said first and said second terminal of said resistor network;

means responsive to said operate signal and said restraint signal for generating said second output signal of each of said first and said second pilot relay if the voltage difference between said operate signal and said restraint signal exceeds a predetermined limit.

7. A pilot wire relay protection system according to claim 6 wherein said means responsive to said operate signal and said restraint signal comprises;

means for rectifying said operate signal, said rectifying means developing a d.c. signal representative of said operate signal, said d.c. signal being connected to a first end of a third resistor;

means for rectifying said restraint signal, said rectifying means developing a d.c. signal representative of said restraint signal, said d.c. signal being connected to a first end of a fourth resistor;

a summing means having a first and a second input, said first input being connected to the second ends of said third resistor and said fourth resistor, said first input being further coupled to a variable d.c. voltage source, said second input being coupled to said first terminal of said resistor network, said summing means providing a d.c. output signal representative of the algebraic summation of the voltages present at its first and its second inputs;

a level detector means having an input being connected to the d.c. output signal of said summing means, said level detector means providing an output signal if the d.c. level of its input signal exceeds a predetermined value;

a time delay means having a first and a second input and providing a d.c. output signal, said first input coupled to said output signal of said level detector means and a first adjustable resistive-capacitor time network, said second input coupled to a second adjustable resistive-capacitor network, said time delay means generating its said d.c. output signal after a first predetermined time duration initiated upon the occurrence of said output signal from said level detector means, said predetermined time period being further controlled by adjusting a time delay within said first resistive-capacitor network, said time delay means maintaining its said d.c. output signal for a second time duration being determined by adjusting a time delay within said second resistor-capacitor network, a relay driver means having a first input connected to said d.c. output signal of said time delay means, said relay driver means generating an output signal during the presence of said d.c. output signal of said time delay means, said output signal of said relay driver means energizing a relay coil thereby closing a normally-opened contact controlled by said relay coil, closure of said normally open contact generating said second output signal of said pilot relays.

8. A pilot wire protection system according to claim 7 further comprising;

timer means for interconnecting said d.c. output signal of said time delay means to said input of said relay driver means, said timer means inhibiting application of said d.c. output signal of said time delay means to said input of said relay means until a third predetermined time duration initiated upon the application of electrical power to said timer means has elapsed, said third predetermined time period preventing the relay driver means activation during time periods having a duration less than third predetermined time period in which power is removed and then reapplied to said timer means, whereby said timer means prevents inadvertent turn-on or turn-off operation of said pilot wire relay protection system during inadvertent losses of the electrical power interconnected to said pilot wire relay protection system.

9. A pilot wire relay protection system according to claim 7 further comprising;

means for filtering said d.c. output signal of said means for rectifying said operate signal, said means for filtering said operate signal interconnected between said output of the rectifying means of the operate signal and said first end of said third resistor, and;

means for filtering said d.c. output signal of said means for rectifying said restraint signal, said means for filtering said restraint signal interconnected between said output of the rectifying means of the restraint signal and said first end of said fourth resistor.

10. A pilot wire relay protection system according to claim 2 wherein said third current sensors provide for a power limiting means to reduce a typical maximum ground current flowing within said electrical power network from a value in the order of 400 amperes to a value in the order of 50 amperes, whereby a current rating of said third current sensors is correspondingly reduced from 400 to 50 amperes.

11. A pilot relay comprising;

a first plurality of terminals for receiving a first, a second, a third and a fourth electrical signal, said first, second, and third electrical signals respectively representative of current flowing within a first, a second, and a third transmission line indicative of phases A, B and C, respectively, an electrical power network, said fourth electrical signal representative of current flowing within said first, second, and third transmission lines;

a second plurality of terminals for receiving a voltage reference potential, a signal transmitted from an electrical source, a signal for transmittal to a power driven circuit breaker, and a pair of twisted-shielded conductors;

a first transformer having an air-gapped core, a center-tapped primary winding and a secondary winding, each of said windings having a high and a low side, the high side of the primary winding coupled to the terminals for receiving said third signal representative of current flowing within said third transmission line indicative of phase C, herein termed $\phi C$, of said network, the low side of the primary winding coupled to said terminal for receiving said second electrical signal representative of current flowing within said second transmission line indicative of phase B, herein termed φB, of said network, a first and a second variable impedance means each having a first a second and a third terminal, said second terminal of said second variable impedance means being connected to the terminal receiving said voltage reference potential, said first terminal of said first variable impedance means coupled to said low side of said secondary winding of said first transformer and also coupled to said terminal for receiving said first signal representative of current flowing within said first transmission line indicative of phase A, herein termed φA, of said network, said first terminal of said second variable impedance means coupled to said second terminal of said first variable impedance means and to the center-tap of said primary winding, and also coupled to the terminal for receiving said fourth signal representative of the current flowing with said first, second and third transmission line currents constituting phases A, B, and C, respectively, of said network, said second terminal of said second variable impedance means also coupled to the terminal for receiving said fourth electrical signal, whereby said arrangement of said first and second variable impedance means develop a first, a second, and a third voltage, said first voltage, herein termed $X_1$, being developed across said first and second terminals of said first variable impedance means and having an amplitude determined by the impedance between the first and second terminals of said first variable impedance means, said second voltage, herein termed $X_2$, being developed across said second and third terminals of said second variable impedance means and having an amplitude determined by the impedance between the second and third terminals of said second variable impedance means, said third voltage, herein termed $X_3$, being developed across said first and second terminals of said second variable impedance means and having an amplitude determined by the impedance betwen the first and second terminals of said second impedance means;

a saturation transformer having a variable tapped primary winding with a high and a low side and a secondary winding having a high and a low side, said low side of said primary winding coupled to said third terminal of said first variable impedance means, said high side of said primary winding being coupled to said high side of said secondary winding of said first transformer;

said arrangement of said first transformer, said first and second variable impedance means, and said saturation transformer generating a composite signal, herein termed CS, applied across said secondary winding of said saturation transformer and representative of a vector sum of the developed coupled current of the first, second, third and fourth received electrical signals according to the following relationship;

$$CS = K1\phi A + K2\phi B + K3\phi C + K4\phi A - \phi B - \phi C$$

wherein K1, K2, K3 and K4 are constants determined by the turns-ratio of said first transformer and the resistance values of said first and second variable impedance means;

said secondary winding of said saturation transformer being further arranged across a voltage limiting means comprising a serially connected first resistor and a zener diode having values selected to limit the composite signal across the secondary winding of the saturation transformer to a predetermined voltage;

an isolation transformer having a primary winding coupled across said secondary winding of said saturation transformer having applied across it said composite signal, and further having a secondary winding coupled across said pair of terminals for receiving said pair of twisted shielded conductors;

a resistor network having a first, a second and a third terminal, said first terminal coupled to the low side of the secondary winding of the saturation transformer and also further coupled to one end of a second resistor and a first terminal of third variable resistor having a resistance between said first terminal and a second terminal being adjustable by positioning an arm of said variable resistor, said second terminal of the resistor network coupled to the second end of said second resistor and a low side of said primary winding of said isolation transformer, said resistor network having means for selectably connecting said second terminal of said resistor network to said second terminal of said third variable resistor, whereby positioning the arm of said third variable resistor adjusts the amplitude of a restraint signal developed across said first and said second terminal of said resistor network;

means for rectifying an operate signal comprised of an alternating-current signal representative of the composite signal of said rectifying means developing a d.c. signal representative of said operate signal, said d.c. signal being connected to a first end of a third resistor;

means for rectifying said restraint signal, said rectifying means developing a d.c. signal representative of said restraint signal, said d.c. signal being connected to a first end of a fourth resistor;

a summing means having a first and a second input, said first input being connected to the second ends of said third resistor and said fourth resistor, said first input being further coupled to a variable d.c. voltage source, said second input being coupled to said first terminal of said resistor network, said summing means providing a d.c. output signal representative of the algebraic summation of the voltages present at its first and its second inputs;

a level detector means having an input being connected to the d.c. output signal of said summing means, said level detector means providing an output signal if the d.c. level of its input signal exceeds a predetermined value;

a time delay means having a first and a second input and providing a d.c. output signal, said first input coupled to said output signal of said level detector means and a first adjustable resistive-capacitor time network, said second input coupled to a second adjustable resistive-capacitor network, said time delay means generating its said d.c. output signal after a first predetermined time duration initiated upon the occurrence of said output signal from said level detector means, said predetermined time period being further controlled by adjusting a time delay within said first resistive-capacitor network, said time delay means maintaining its said d.c. output signal for a second time duration being determined by adjusting a time delay within said second resistor-capacitor network, a relay driver means having a first input connected to said d.c. output signal of said time delay means, said relay driver means generating an output signal during the presence of said d.c. output signal of said time delay means, said output signal of said relay driver means energizing a relay coil thereby closing a normally-open contact controlled by said relay coil, said closure of the normally-open contact interconnecting said terminal for receiving said signal transmitted from an electrical source and said terminal for receiving said signal for transmittal to said power driven circuit breaker.

12. A pilot wire protection system according to claim 11 further comprising;

timer means for interconnecting said d.c. output signal of said time delay means to said input of said relay driver means, said timer means inhibiting application of said d.c. output signal of said time delay means to said input of said relay means until a third predetermined time duration initiated upon the application of electrical power to said timer means has elapsed, said third predetermined time period preventing the relay driver means activation during time periods having a duration less than third predetermined time period in which power is removed and then reapplied to said timer means, whereby said timer means is capable of preventing inadvertent turn-on or turn-off operation of said pilot wire during inadvertent losses of the electrical power interconnected to said pilot relay.

13. A pilot wire relay protection system according to claim 11 further comprising;

means for filtering said d.c. output signal of said means for rectifying said operate signal, said means for filtering said operate signal interconnected between said output of the rectifying means of the operate signal and said first end of said third resistor, and;

means for filtering said d.c. output signal of said means for rectifying said restraint signal, said means for filtering said restraint signal interconnected between said output of the rectifying means of the restraint signal and said first end of said fourth resistor.

* * * * *